May 3, 1966
D. G. ANDERSON ETAL
3,249,776
NUTATION MOTOR
Filed June 13, 1962
5 Sheets-Sheet 1
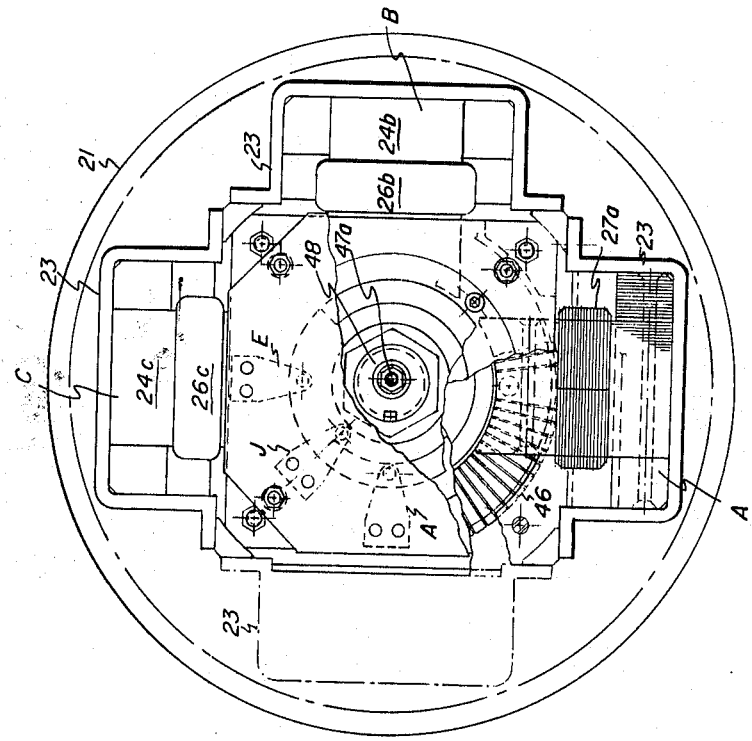
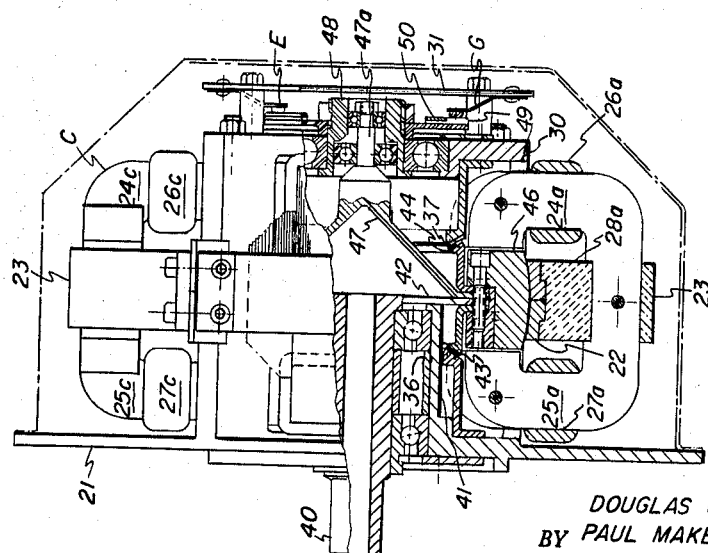
INVENTOR.
DOUGLAS G. ANDERSON
BY PAUL MAKER
DAVID J. SCHAFFER
Richard J. Seeger
ATTORNEY May 3, 1966  D. G. ANDERSON ET AL  3,249,776
NUTATION MOTOR
Filed June 13, 1962  5 Sheets-Sheet 3

INVENTOR.
DOUGLAS G. ANDERSON
BY PAUL MAKER
DAVID J. SCHAFFER

Richard J. Seeger
ATTORNEY

May 3, 1966  D. G. ANDERSON ETAL  3,249,776
NUTATION MOTOR

Filed June 13, 1962  5 Sheets-Sheet 5

INVENTOR.
DOUGLAS G. ANDERSON
PAUL MAKER
BY DAVID J. SCHAFFER

ATTORNEY

3,249,776
NUTATION MOTOR

Douglas G. Anderson, Ferndale, Paul Maker, Birmingham, and David J. Schaffer, Farmington, Mich., assignors to The Bendix Corporation, Research Laboratories Division, Southfield, Mich., a corporation of Delaware Filed June 13, 1962, Ser. No. 202,228
12 Claims. (Cl. 310—82)

This invention pertains to a nutator motor which is particularly advantageous where low inertia, high torque, and compact size are required.

Objects of this invention include providing a motor having very low inertia and very high developed torque and a high ratio between output torque and developed torque without an auxiliary transmission gear system. This in turn results in a less expensive, more compact motor package which is very desirable in many applications. This invention utilizes nutating gears which are rolled or wobbled between two fixed annular bevel gears which are opposed to each other. The nutating gears are located between the two fixed gears and the teeth on one side of the nutator gear perimeter mesh with one of the fixed gear sets, and the teeth on the other side of the nutating gear perimeter mesh with teeth of the opposed fixed gear set. The number of teeth on the nutating gear perimeter differs by one from the fixed gear sets so that as the nutating gears experience one nutation cycle, the nutating gears rotate or advance by one tooth width along the fixed gears.

This invention provides in combination with the nutating gear a ring of magnetic material fixed to the rim of the nutating gear and a variable magnetic field causes the magnetic ring to nutate, driving the nutating gear. In a preferred embodiment, the variable magnetic field is provided by four E shaped pole pieces which are spaced 90 degrees apart and which have the outer legs of the pole pieces adjacent to the magnetic ring. The outer legs of the pole pieces are also wound with coils which are provided with commutated current and the center leg of the E is a permanent magnet. By changing the direction of the current in the coils, each portion of the magnetic ring is moved back and forth between the outer legs of the pole pieces, causing the nutation.

These and other objects will become more apparent when preferred embodiments are considered in connection with the drawings in which:

FIGURE 1 is a partly broken away, partly sectioned elevational view of a preferred embodiment of this invention;

FIGURE 2 is a partly broken away, partially sectioned front view of the embodiment in FIGURE 1;

Figure 3:
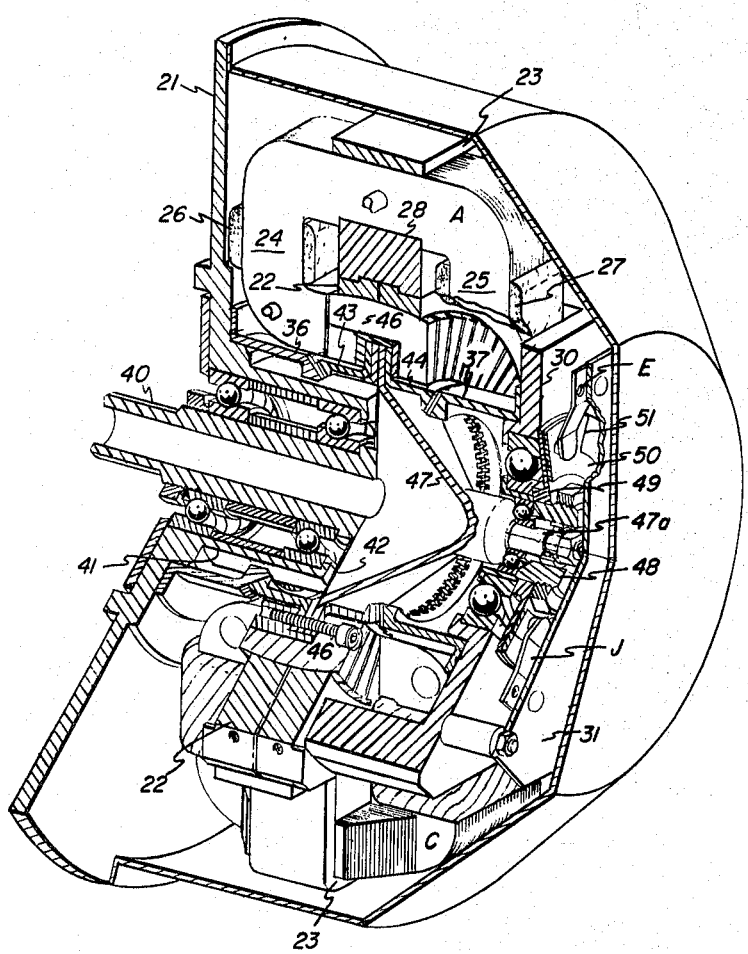
FIGURE 3 is a cut-away perspective view of the embodiment shown in FIGURES 1 and 2.

The first preferred embodiment will be discussed in connection with FIGURES 1–6 of the drawings. A base 21 is fixedly mounted to its environmental frame. Bolted to base 21 is stator ring 22 which is in the general shape of a ring and forms the foundations for the four pole pieces, A, B, C and D, (D is not known) each of which is held by means of straps 23 to the stator ring 22. The pole pieces, A to D are spaced 90 degrees apart as shown in FIGURE 2 and each comprises a channel shaped member shown in FIGURE 3 of magnetic material having outer legs 24, 25 which have coils 26, 27 wound respectively thereabout. The legs 24, 25 and coils 26, 27 are designated for each pole piece A–D by placing the pole piece letter as a suffix to the leg or coil numeral. As will be brought out later in connection with FIGURE 6, the winding schematic, each coil is composed of two separate windings.

At each pole piece A to D the stator ring 22 is adapted to receive a permanent magnet 28 between the ring 22 and the pole piece forming a central leg and providing a constant permanent flux divided between the outer legs of the channel as will be discussed in connection with the schematic of FIGURE 4.

Figure 6:
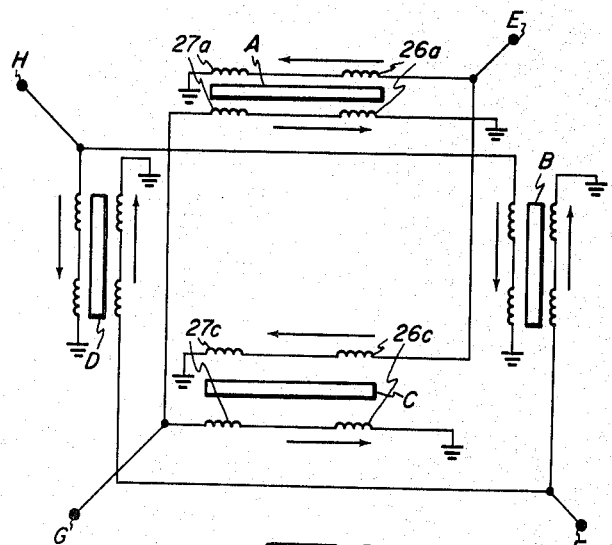
FIGURE 6 is a schematic wiring diagram of the embodiment shown in FIGURES 1 to 3.
Figure 4:
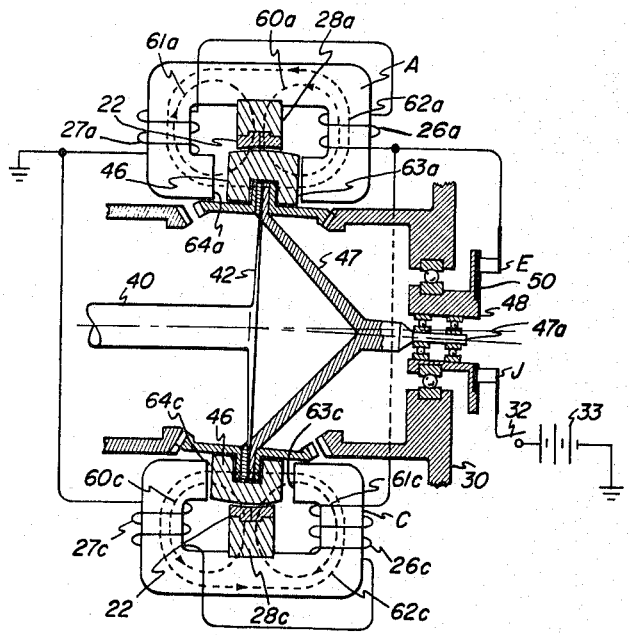
FIGURES 4 and 5 are a schematic showing of the embodiment shown in FIGURES 1 to 3.

An annular plate 30 is bolted to stator ring 22 and supports a brush carrier disc 31 which has screwed thereto four coil brushes E, F, G and H which are connected to the coils wound about the pole pieces A to D as will be explained in connection with winding schematic of FIGURE 6, and a common brush J which is connected through a switch 32 to a direct current power supply 33 as shown in the schematic of FIGURE 4.

Two remaining fixed non-rotating elements of this embodiment are annular bevel gears 36, 37 with gear 36 being fixed as by bolting or welding to base 21 and gear 37 being bolted or otherwise fixed to plate 30. Gears 36 and 37 have the same number of teeth and the same tooth characteristics and are fixed in alignment to each other on their respective supports.

The rotating elements of this preferred embodiment will now be discussed. The output shaft 40 is journaled in ball bearings inside of tubular bearing housing 41 which is fixed to base 21. Connected to output shaft 40 as by welding is a thin flexible metal diaphragm 42 which is bolted at its periphery to nutating gear segments 43, 44. Gears 43, 44 are annular bevel gears which are in alignment with and mesh with respectively gears 36 and 37. However, gears 43 and 44 each have one more tooth than gears 36 and 37. It is this difference which causes gears 43 and 44 to move in rotation relative to the fixed gears 36 and 37 when the gears 43 and 44 are caused to nutate about the axis of output shaft 40. The number of teeth in the nutating gear (43 or 44) determines the mechanical advantage or multiplication between developed torque and output torque and in this embodiment the number is 99. The nutation of gears 43 and 44 is possible due to the universal type coupling of the flexible diaphragm 42.

Also bolted to the outer periphery of diaphgram 42 is nutating ring 46 which is comprised of a magnetic material and is caused to oscillate between the outer legs of pole pieces A to D sequentially thereby imparting the nutating motion to gears 46 and 47.

A cone 47 is also fixed to the periphery of diaphgram 42 and terminates in a spindle 47a which is journaled through ball bearing rings in a sleeve 48 having an opening therein eccentric to the axis of output shaft 40. This eccentricity causes sleeve 48, which is ball bearing mounted in plate 30, to rotate once every time gears 43, 44 experience one complete nutation cycle.

Figure 5:
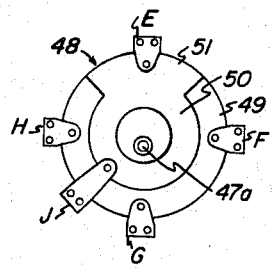

Fixed to and rotating with sleeve 48 is commutator 49 which has an inner conductive ring 50, shown in the schematic of FIGURE 5 clearly, and an outer conductive portion 51 which covers a circumference quadrant of commutator 49. With this arrangement it is seen that at least one of the brushes E through H, each of which is spring urged against commutator 49, is in electrical communication with brush J which is spring urged against the inner conductive ring 50 of commutator 49. This provides the commutating action of changing the current sequentially in the coils of pole pieces A to D to cause the nutating action.

The brushes and coil windings will now be described in connection with winding schematic shown in FIGURE 6. Brush E has a winding that has a portion in coil 26a and a portion in coil 27a and carries current in the direction of the arrow; brush E also has a winding which has portions in coil 27c and 26c and carries current in direction of the arrow. By connecting each brush through windings in opposite pole pieces, when one portion of the periphery of the nutating ring 46 is attracted towards the right, the portion diametrically opposed on the nutating ring is attracted towards the left by the opposite pole piece. This may be seen by looking at the schematic of FIGURE 4. In pole piece A the permanent magnet 28a establishes two paths of flux 60a and 61a going in the direction shown by the arrows. The flux created by the coils 26a and 27a in pole piece A is shown by dotted line 62a and flows in the direction shown by the arrow. It is seen that this flux reinforces flux 60a and opposes flux 61a so that the flux in air gap 63a is much greater than the flux in gap 64a thereby attracting ring 46 causing it to move to the right. At the same time in the opposite pole piece C the winding attached to brush E causes flux in the direction of the arrow, and magnetic path 62c reinforces the flux from permanent magnet 28c in the left leg of pole piece C and opposes the flux from permanent magnet 28c in the right leg of pole piece C. This causes a greater amount of flux in gap 64c than in 63c causing the bottom portion of ring 46 to move to the left.

For the same reasons and in the same manner brush F is connected to windings on pole pieces B and D, brush G is connected to windings on pole pieces A and C and establishes flux a direction opposite to that for brush E, brush H is connected to windings on pole pieces B and D and establishes flux in a direction opposite to that for brush F.

*Operation of FIGURES 1–6 embodiment*

Briefly then, the operation of this embodiment will be discussed in reference to FIGURES 4–6. Switch 32, which may be a reversing switch for reversible motor operation, is closed causing a potential at the common brush J which communicates this potential to the brush which is in contact with outer segment 51. This will cause a magnetic flux to be established in opposite pole pieces, depending on which brush is contacted. When brush A is contacted, the flux created by the coil windings in pole piece A and in pole piece C will be such that it opposes the flux 61a and 61c from magnets 28a and 28c respectively and reinforces the flux 60a and 60c from magnets 28a and 28c so that the flux in air gaps 63a and 64c is much greater than that in the air gap 64a and 63c, causing the top portion of the ring as viewed in FIGURE 4 to move rightwardly and the bottom portion to move leftwardly.

This tilting or nutation causes sleeve 48 to move one quarter turn thereby energizing the other two pole pieces B and D causing the magnetic ring 46 to tilt in another direction further rotating commutator 49, which is attached to sleeve 48, energizing still another brush, maintaining a wobbling or nutating of ring 46 at an acceleration which is limited only by the friction and inertia of the ring. For controlled acceleration, control of voltage applied to coils on pieces A to D could be provided.

For every cycle of nutation (rolling of ring 46 from one of the fixed gears 36, 37 toward the other fixed gear 36, 37 and back again), the output shaft 40 moves the width of one gear tooth. The mechanical advantage can be controlled by placing the desired number of teeth in gears 36, 37 and 43, 44. The ratio between the nutating frequency ($W_n$) and the rotating frequency ($W_0$) of the output shaft 40 is equal to $1/R$ where R is the number of teeth in the nutating gear.

Where a very high ratio is desired, it can be obtained by giving each pair of gears 36, 43 and 37, 44 a different ratio. Then one gear will be fixed; the nutating gears will float on their mounting; and the remaining gear will be conventionally attached to the output shaft.

Therefore, it is seen that by varying R, a reduction of speed or multiplication of torque may be accomplished without an auxiliary transmission. Further, since ring 46 never reaches a high rotational speed and since its nutating travel is very small, in the order of one degree, the inertia is very low allowing rapid acceleration a very high developed torque.

If the output shaft is desired to drive a crank shaft in an automobile engine for purposes of starting the engine, then an overrunning clutch may be utilized in a well known manner to allow the crank shaft to overrun the output shaft 40 once the engine is started.

Figures 7, 7A:
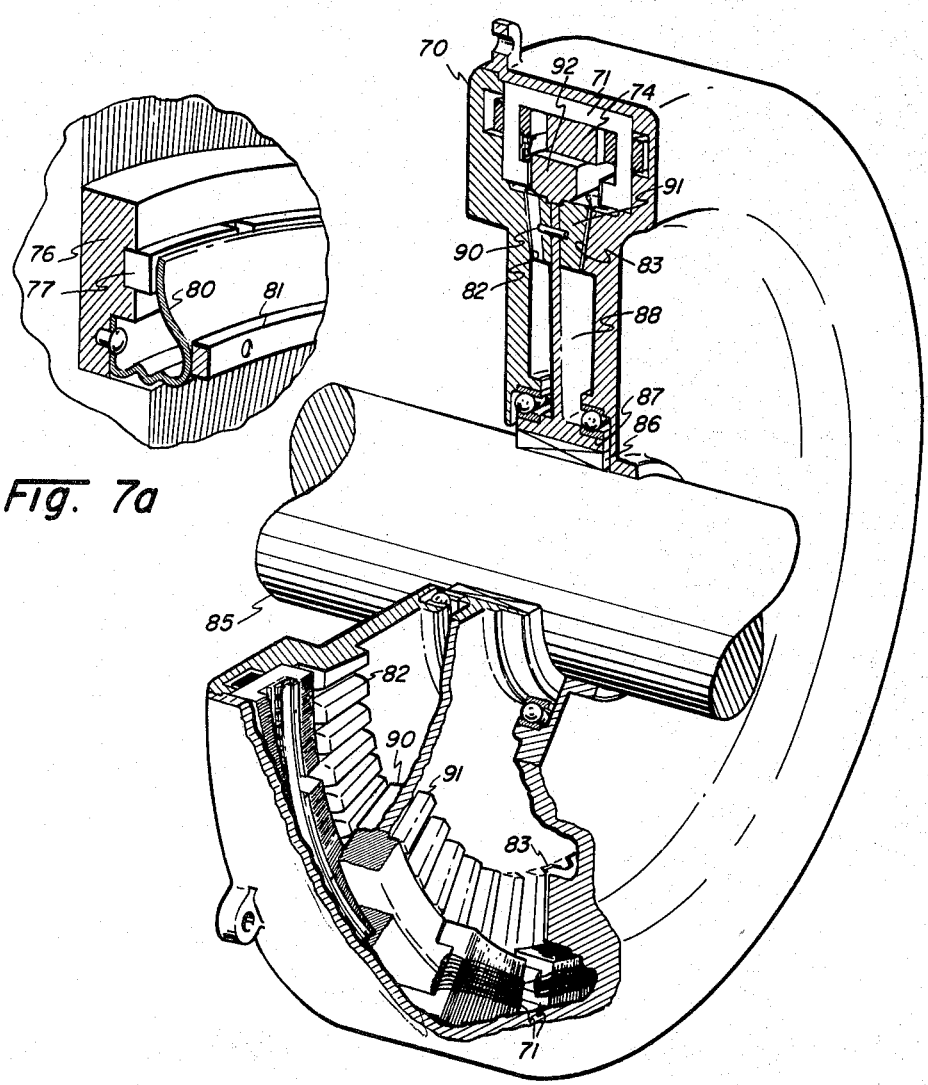
FIGURE 7 is a cut-away view in perspective of a second embodiment.
FIGURE 7a is an enlarged view of a portiton of the embodiment shown in FIGURE 7.
Figure 8:
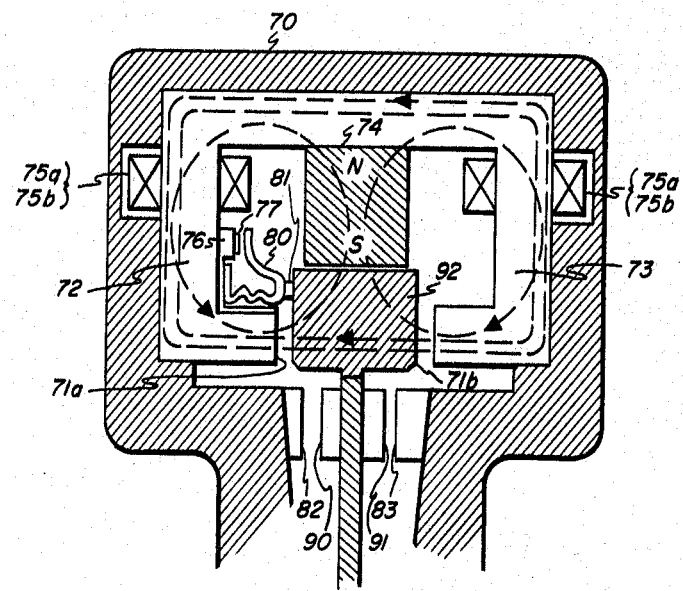
FIGURE 8 is an enlarged elevational view of the coil and magnets of the embodiment shown in FIGURE 7.
Figure 9:
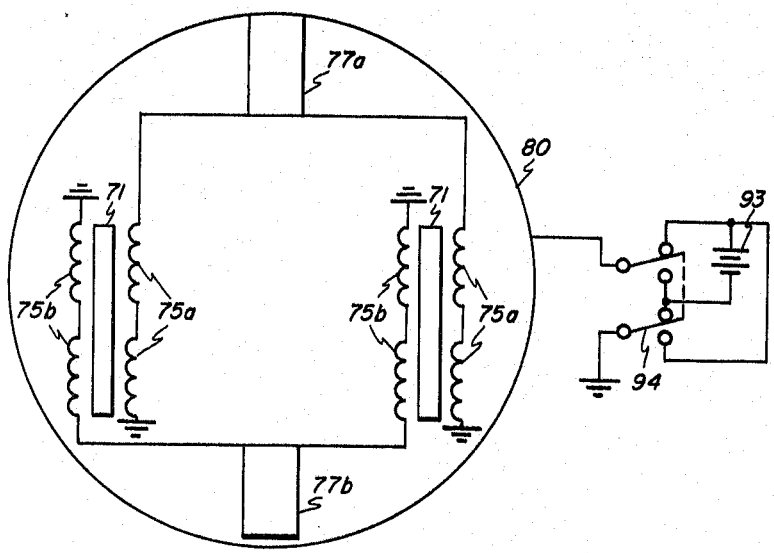
FIGURE 9 is a winding schematic for only one pair of diametrically opposite commutator bars of FIGURE 7.

*Embodiment of FIGURES 7–9*

A second preferred embodiment is shown in FIGURES 7 and 8 which also utilizes the nutating gear but employs a different commutation means. In FIGURES 7, 7a and 8, a frame 70 which is generally in the shape of a hollow disc, supports at its periphery a plurality of arcuate channel shaped segments 71 of electromagnetic material. Each channel segment 71 has legs 72 and 73. Each segment 71 has two windings 75a and 75b, one winding connected to one commutator bar, later described, and the other winding connected to a diametrically opposed commutator bar. Each winding 75a and 75b has a portion wound on each leg 72, 73 of a segment 71. The two portions of each winding are series connected but parallel connections between the coils in one winding could equally well be made. In this embodiment there are many segments 71, all of which are attached to the periphery of a permanent magnet ring 74, having one pole on the outer diameter and the other pole on the inner diameter.

Fixed to the inside of leg 72 of each segment 71 is an insulating mounting ring 76 which supports a series of commutator bars 77 which are circumferentially spaced from one another and which are connected to windings 75a and 75b of segments 71 located 90° on each side of the commutator bar, so that each commutator bar 77 is connected to and energizes two diametrically opposite segments 71. These same segments 71 will be oppositely energized 180° later in the nutation cycle by a commutator bar diametrically opposite to the last mentioned commutator bar.

Also mounted to ring 76 is an annular spring member 80 which carries along the inner portion thereof an insulating pressure strip 81. A power source is connected to spring 80 and when the spring is urged against a commutator bar, in a manner to be later described, the commutator bar is electrically connected to the power source through spring 80 and energizes its corresponding coil windings 75a and 75b.

Formed on one wall of frame 70 is a bevel gear 82 and formed on the opposite wall is another bevel gear 83. Gears 82 and 83 are alike in conformation and number of teeth.

The moving elements of this embodiment will now be described. An output shaft 85 is journaled centrally of frame 70 and is driven by overrunning clutch 86 which in turn is driven by hub 87 of a flexible torque disc 88 which is a thin flexible disc of metal.

Fixed to the outer periphery of disc 88 on one side thereof is a bevel gear 90 and fixed to the other side of the outer periphery of disc 88 is a bevel gear 91. Gears 90 and 91 mesh respectively with gears 82 and 83 and each gear 90 and 91 has one more tooth than gears 82, 83. Fixed to the rim of nutating or torque disc 88 is a ring of magnetic material 92.

As shown in FIGURE 9 is a winding diagram for one pair of diametrically opposite commutator bars 77a and 77b. Bar 77b is connected to windings 75b of two diametrically opposed segments 71 each spaced 90° from bar 77b and bar 77a is connected to windings 75a of the same two segments 71. For approximately one quarter cycle of nutation, bar 77b is connected to the power source 93 through ring 80 and switch 94. Spring 80 is pressed against the commutator bar 77b by the pressure of ring 92, rolling against the insulating strip 81. Energizing windings 75b causes ring 92 to be attracted towards gear 82 at one winding 75b and towards gear 83 at the other winding 75b imparting a nutating motion of the ring 92. In like manner, commutator bar 77a causes windings 75a to impart a nutating motion to ring 92 when spring 80 is pressed into contact with bar 77a. This action is similar to that for the embodiment in FIGURES 1-3.

Operation

Briefly then the operation of this embodiment is as follows. Voltage is applied to spring 80 from power source 93 through reversible switch 94, and this voltage is then applied to the commutator bar 77 with which the spring is in contact. This commutator bar 77 then energizes its respective windings 75b which are spaced circumferentially 90° from the commutator bar energized, causing the flux to be set up in outer legs 72, 73 thereby attracting the ring 92 in a direction to continue the nutation. When a winding 75a or 75b is energized, flux paths are established in channel 71 which oppose the permanent magnet 74 flux in one air gap 71a and reinforce the flux in the other air gap, 71b.

As ring 92 moves to leg 72, it presses insulating pressure ring 81 causing the spring 80 to contact a new commutator bar 77 which in turn energizes a coil circumferentially spaced from the bar to attract the ring 92 at the circumferentially spaced at point and thereby maintain the nutation. The acceleration with which this takes place is limited only by the inertia, which is very small, of this system and the friction, which is minimized due to ball bearing journaling. In this manner very high torque is developed before the gear reduction takes place which reduction is equal to the number of teeth in the nutating gear as explained for the previous embodiment resulting in exceptionally high torque at the output shaft 85 without an auxiliary transmission.

In both embodiments the torque developed before the gear reduction is very high in respect to the inertia of the system. The power supplied may be polyphase A.C. and the commutation may be controlled by an external source, if desired, so that the acceleration and speed may be closely controlled.

By applying torque to the output shaft of the embodiment shown in FIGURES 1-3 a low input speed generator is provided. When using as a generator in the embodiment of FIGURES 1-3, the sleeve 48 could be driven, all gears could be omitted, and the nutating ring could be mounted with a ball joint to a fixed hub.

While in the preferred embodiments, two sets of gears are used, just one set only, i.e. one nutating gear and one fixed gear, could be used in combination with a suitable universal joint.

In addition, the non-nutating gear could be mounted to the output shaft in which event the nutating gear would be universally mounted to the frame.

The principles involved in this invention are susceptible of numerous applications which will be apparent to persons skilled in the art. The invention is therefore to be limited only as indicated by the scope of the appended claims.

Having thus described our invention, we claim:

1. A motor or generator comprising
   a nutating member mounted for nutational motion,
   motion converting means to convert between said nutating motion and rotary motion of said nutating member,
   energy converting means to convert between the energy of the nutational motion of said nutating member and electrical energy,
   said energy converting means comprising at least one magnetic circuit having a first magnetic member,
   a second magnetic member attached to said nutating member and being in said magnetic circuit,
   a plurality of air gaps between said first and second magnetic members,
   said magnetic circuit having two sources of magnetomotive force for producing flux in said air gaps so that the fluxes from said sources are reinforcing in one air gap and opposing in another air gap, with one of said sources providing a flux that is variable in magnitude relative the flux from the other of said sources to cause the difference between the fluxes in said air gaps to vary.

2. The apparatus of claim 1 with
   a plurality of said magnetic circuits arranged about and spaced from the circumference of the nutating member,
   whereby a torque may be applied regardless of nutating member position.

3. The apparatus of claim 1 with
   said first magnetic member having three legs, two of said legs being adjacent the said second magnetic member and spaced therefrom to form said air gaps,
   said third leg being closely adjacent to said second magnetic member and said second magnetic member being movable relative thereto,
   said third leg providing a common path for only a portion of the flux in said other two legs, and with a portion of said flux not passing through said third leg.

4. The apparatus of claim 3 with
   an air gap being at each of opposite ends of said second magnetic member whereby the total length of said air gaps at said opposite ends is substantially constant minimizing the effect of variation in position of said second magnetic member on the portion of flux not passing through said third leg.

5. The apparatus of claim 4 with
   one of said sources of magnetomotive force being an electromagnet generating flux in said first and second legs,
   a second source of magnetomotive force generating flux in said third leg.

6. The apparatus of claim 5 with
   commutating means to cause two energizations of said electromagnetic source for each magnetic circuit for each nutation cycle, with one of said energizations being opposite in polarity to the other.

7. The apparatus of claim 2 with
   one magnetic circuit being opposite a second magnetic circuit,
   commutating means to simultaneously connect said one magnetic circuit and said second magnetic circuit to an external electrical circuit so that said magnetic circuits cooperate in conversion between energy of nutational motion and electrical energy.

8. The apparatus of claim 1 with
   a non-nutating member,
   said motion converting means comprising gear means between said nutating member and a non-nutating member,
   a fixed frame,
   a rotatable member,
   a flexible diaphragm being connected between said nutating member and one of said rotatable member and fixed frame,
   a rigid connection between the non-nutating member and the other of said rotatable member and fixed frame.

9. The apparatus of claim 1 with
a non-nutating member,
said motion converting means comprising gear means between said nutating member and a non-nutating member,
a fixed frame,
a rotatable member,
a universal joint being connected between said nutating member and one of said rotatable member and fixed frame,
a rigid connection between said non-nutating member and the other of said rotatable member and fixed frame,
said gear means comprising toothed gears,
means to limit the degree of nutation of said nutating member, thereby preventing said toothed gears from becoming too tightly engaged.

10. The apparatus of claim 9 with
said means to limit the degree of nutation comprising an eccentric sleeve rotatably mounted in said fixed frame,
a spindle extending from said nutating member and journalled in said eccentric sleeve.

11. The apparatus of claim 8 with
a plurality of magnetic circuits arranged about and spaced from the circumference of said nutating member,
one of said sources in each of said magnetic circuits being a permanent magnet means so that said nutating member is held in geared relationship with said non-nutating member when said second source is de-energized or at maximum torque position.

12. A motor or generator comprising a tilting member mounted for tilting movement in all directions,
motion converting means to convert between said tilting motion and rotary motion of said tilting member,
energy converting means to convert between the energy of the tilting motion of said tilting member and electrical energy,
said energy converting means comprising at least one magnetic circuit having a first magnetic member,
a second magnetic member attached to said tilting member and being in said magnetic circuit,
at least two air gaps between said first and second magnetic members,
said magnetic circuit having two sources of magnetomotive force for producing flux in said air gaps so that the fluxes from said sources are reinforcing in one air gap and opposing in the other air gap, with one of said sources providing a flux that is variable in magnitude relative the flux from the other of said sources to cause the difference between the fluxes in said air gaps to vary.

References Cited by the Examiner

UNITED STATES PATENTS

| | | | |
|---|---|---|---|
| 1,611,981 | 12/1926 | Amberg | 74—800 |
| 2,275,827 | 3/1942 | Plensler | 310—82 |
| 2,699,690 | 1/1955 | Kobler | 74—800 |
| 2,703,370 | 3/1955 | Steensen | 310—82 |
| 2,871,382 | 1/1959 | Bouvier | 310—82 |

FOREIGN PATENTS 233,459  10/1944  Switzerland.

MILTON O. HIRSHFIELD, *Primary Examiner.*